United States Patent
Panshin et al.

(10) Patent No.: US 9,707,784 B2
(45) Date of Patent: *Jul. 18, 2017

(54) REPLACEABLE PRINTER COMPONENT

(71) Applicant: HEWLETT-PACKARD DEVELOPMENT COMPANY, L.P., Houston, TX (US)

(72) Inventors: Stephen D. Panshin, Corvallis, OR (US); Jefferson P. Ward, Brush Prairie, WA (US); David B. Novak, Philomath, OR (US); Glenn D. McCloy, Corvallis, OR (US); Brian L. Helterline, Salem, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/149,753

(22) Filed: May 9, 2016

(65) Prior Publication Data
US 2016/0250872 A1  Sep. 1, 2016

Related U.S. Application Data

(63) Continuation of application No. 12/994,756, filed as application No. PCT/US2008/065108 on May 29, 2008.

(51) Int. Cl.
*G06F 15/02* (2006.01)
*B41J 29/38* (2006.01)
(Continued)

(52) U.S. Cl.
CPC .......... *B41J 29/38* (2013.01); *B41J 2/17546* (2013.01); *G03G 15/0863* (2013.01);
(Continued)

(58) Field of Classification Search
CPC ..... B41J 29/38; B41J 2/17546; G06F 21/602; G06F 21/79; H04L 2209/04;
(Continued)

(56) References Cited

U.S. PATENT DOCUMENTS 4,961,088 A   10/1990 Gilliland et al.
5,610,635 A   3/1997 Murray et al.
(Continued)

FOREIGN PATENT DOCUMENTS

CN   1452840 A   10/2003
GB   2354735 A   4/2001
(Continued)

OTHER PUBLICATIONS

Chinese Search Report dated May 10, 2013 issued on CN Patent Application No. 200880130571.X.
(Continued)

*Primary Examiner* — Kent Yip
(74) *Attorney, Agent, or Firm* — Dicke, Billig & Czaja, PLLC

(57) ABSTRACT

A replaceable printer component includes a memory device to store a tag encryption mask and data. The data is stored in a plurality of blocks of the memory device wherein each block is defined by a tag. The tag encryption mask indicates an encryption status of each block of the memory device defined by the tag. The replaceable printer component includes a communication link to communicatively link the memory device to a printer controller when the replaceable printer component is installed in a printing system. The tag encryption mask is stored within a header of the memory device. Each tag defines a type and a length of the data stored in the blocks.

19 Claims, 3 Drawing Sheets

(51) Int. Cl.
*B41J 2/175* (2006.01)
*G06F 21/79* (2013.01)
*G03G 15/08* (2006.01)
*G06F 21/60* (2013.01)

(52) U.S. Cl.
CPC ............ *G06F 21/602* (2013.01); *G06F 21/79* (2013.01); *G03G 2215/0697* (2013.01); *G03G 2221/1823* (2013.01); *H04L 2209/04* (2013.01)

(58) Field of Classification Search
CPC ....... G03G 15/0863; G03G 2215/0697; G03G 2221/1823
USPC ................................................ 358/1.14–1.16
See application file for complete search history.

(56) References Cited

U.S. PATENT DOCUMENTS

| | | | |
|---|---|---|---|
| 5,699,091 A | 12/1997 | Bullock et al. | |
| 5,812,156 A | 9/1998 | Bullock et al. | |
| 5,835,817 A | 11/1998 | Bullock et al. | |
| 6,019,461 A | 2/2000 | Yoshimura et al. | |
| 6,039,430 A | 3/2000 | Helterline et al. | |
| 6,126,265 A | 10/2000 | Childers et al. | |
| 6,264,301 B1* | 7/2001 | Helterline | B41J 2/17546 347/19 |
| 6,459,860 B1 | 10/2002 | Childers | |
| 6,488,352 B1 | 12/2002 | Helterline et al. | |
| 6,722,753 B2 | 4/2004 | Helterline et al. | |
| 6,738,903 B1* | 5/2004 | Haines | B41J 2/17509 380/22 |
| 6,817,693 B2 | 11/2004 | Phillips et al. | |
| 7,278,031 B1* | 10/2007 | Best | A63F 13/10 713/191 |
| 7,360,131 B2 | 4/2008 | Walmsley | |
| 2002/0090086 A1* | 7/2002 | Van Rijnsoever | H04L 29/06027 380/207 |
| 2002/0122671 A1 | 9/2002 | Yoshimura | |
| 2003/0231767 A1 | 12/2003 | Carbajal | |
| 2004/0039908 A1 | 2/2004 | Rose | |
| 2007/0211292 A1 | 9/2007 | Walmsley | |
| 2008/0040284 A1 | 2/2008 | Hazel et al. | |

FOREIGN PATENT DOCUMENTS

| | | |
|---|---|---|
| JP | 2002337419 A | 11/2002 |
| JP | 2002366008 A | 12/2002 |
| TW | 200818796 A | 4/2008 |
| TW | 200746637 | 11/2013 |

OTHER PUBLICATIONS

Extended European Search Report dated Apr. 8, 2013 issued on EP Patent Application No. 08756447.2 filed at the European Patent Office.

\* cited by examiner

| ADDRESS (BYTES) | INFORMATION |
| --- | --- |
| 0 → A-1 | HEADER AREA- TAG ENCRYPTION MASK (2-BYTES OF HEADER AREA) |
| A | TAG T0 |
| A+1 → B-1 | TAG T0 DATA |
| B | TAG T1 |
| B+1 → C-1 | TAG T1 DATA |
| C | TAG T2 |
| C+1 → D-1 | TAG T2 DATA |
| D | TAG T3 |
| D+1 → E-1 | TAG T3 DATA |
| E | TAG T4 |
| E+1 → F-1 | TAG T4 DATA |
| F | TAG T5 |
| F+1 → G-1 | TAG T5 DATA |
| G | TAG T6 |
| G+1 → H-1 | TAG T6 DATA |
| H | TAG T7 |
| H+1 → I-1 | TAG T7 DATA |
| I | TAG T8 |
| I+1 → J-1 | TAG T8 DATA |
| J | TAG T9 |
| J+1 → K-1 | TAG T9 DATA |
| K | TAG T10 |
| K+1 → L-1 | TAG T10 DATA |
| L | TAG T11 |
| L+1 → M-1 | TAG T11 DATA |
| M | TAG T12 |
| M+1 → N-1 | TAG T12 DATA |
| N | TAG T13 |
| N+1 → O-1 | TAG T13 DATA |
| O | TAG T14 |
| O+1 → P-1 | TAG T14 DATA |
| P | TAG T15 |
| P+1 → Q-1 | TAG T15 DATA |

Fig. 2

REPLACEABLE PRINTER COMPONENT

RELATED APPLICATIONS

The present application claims the priority under 35 U.S.C. 119(a)-(d) or (f) and under C.F.R. 1.55(a) of previous International Patent Application No. PCT/US2008/065108, filed May 29, 2008, entitled "Replaceable Printer Component Including a Memory Storing a Tag Encryption Mask", which application is incorporated herein by reference in its entirety. Further, the present application is a continuation of and claims priority under 35 U.S.C. §120 to U.S. application Ser. No. 12/994,756, filed Feb. 24, 2011, entitled, "Replaceable Printer Component Including a Memory Storing a Tag Encryption Mask," which is also incorporated herein by reference in its entirety.

BACKGROUND

Current printing systems typically include one or more replaceable printer components, such as inkjet cartridges, inkjet printhead assemblies, toner cartridges, ink supplies, etc. Some existing systems provide these replaceable printer components with on-board memory to communicate information to a printer about the replaceable component, such as ink fill level, marketing information, etc.

Some of the information stored within the on-board memory may be proprietary to the manufacturer of the replaceable printer component. The information stored within the on-board memory should be protected from viewing or unauthorized modifications. In addition, it may be useful for some of the information stored within the on-board memory to be protected from viewing by an eavesdropper when the information is transferred between the on-board memory and a host. Further, the information encrypted and the location of the encrypted information within the on-board memory may change over the lifetime of a printer in which the replaceable printer component will be used.

For these and other reasons, a need exists for the present invention.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 2 is a table illustrating one embodiment of the format of information stored within a memory device of a replaceable printer component.

DETAILED DESCRIPTION

In the following detailed description, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
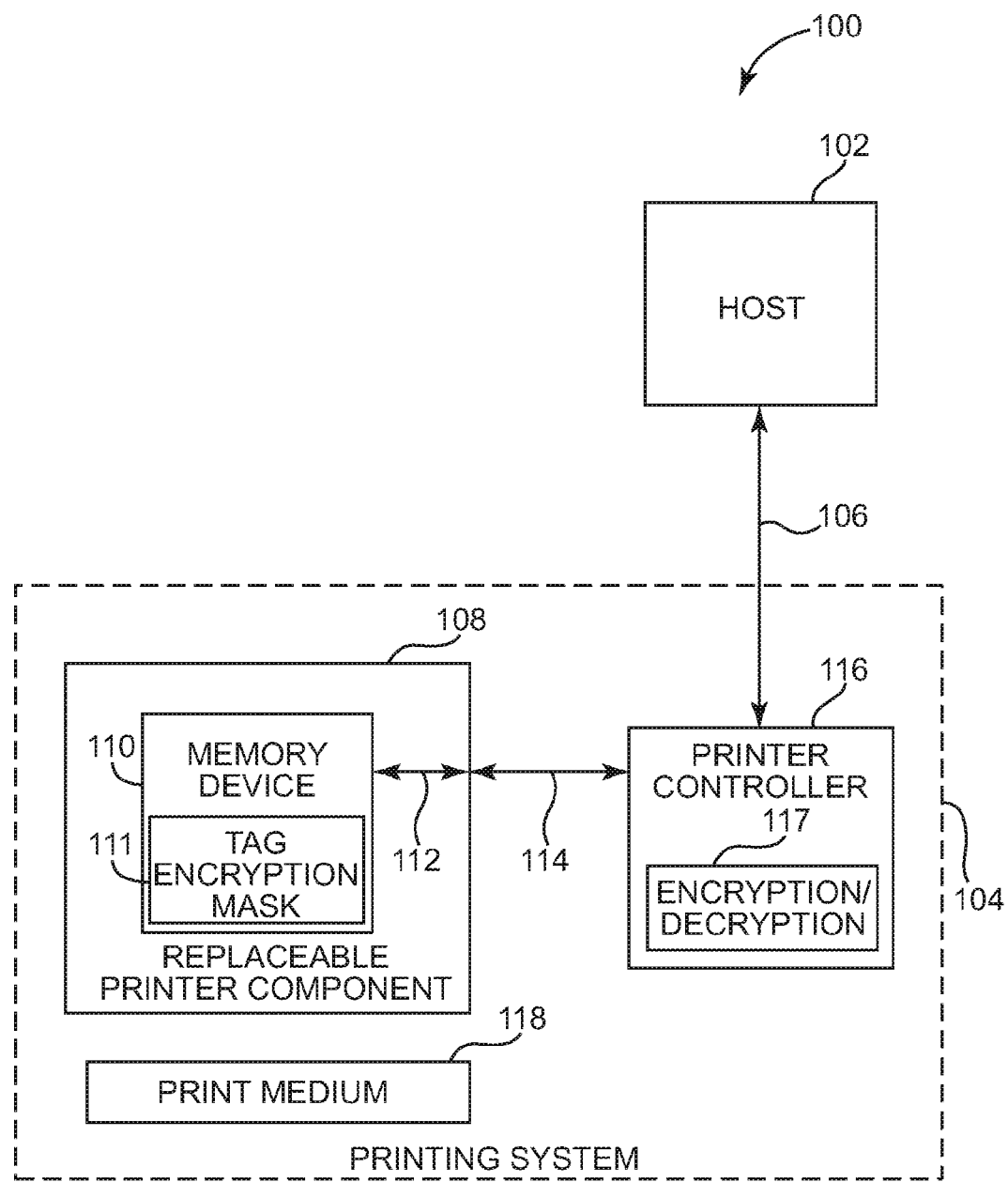
FIG. 1 is a block diagram illustrating one embodiment of a printing arrangement.

FIG. 1 is a block diagram illustrating one embodiment of a printing arrangement 100. Printing arrangement 100 includes a host 102 and a printing system 104. Printing system 104 facilitates printing of graphical and/or textural images on a print medium 118, such as paper, card stock, transparencies, Mylar, cloth, and the like. Printing system 104 includes, for example, an inkjet printer, a laser printer, or other suitable printer. Host 102 communicates with printing system 104 and provides data and/or control signals to printing system 104. Host 102 can be or can be included in a variety of information sources such as a computer, appliance, or other suitable device such as a personal digital assistant (PDA), digital camera, cellular phone, etc.

In one embodiment, printing system 104 includes a printer controller 116 and a replaceable printer component 108. Replaceable printer component 108 includes a memory device 110. In one embodiment, memory device 110 stores a tag encryption mask 111 in a header area of the memory. Tags defining data and the data defined by the tags are stored in memory device 110 in a data area of the memory. The data defined by each tag can be either encrypted or unencrypted. Tag encryption mask 111 indicates the encryption status of the data defined by each tag stored in memory device 110 by indicating whether the data is encrypted or unencrypted.

Printer controller 116 controls the operation of printing system 104 and, as such, receives data and/or control signals from host 102. Printer controller 116 communicates with host 102 via a communication link 106. Communication link 106 includes, for example, an electrical, optical, infrared, or other suitable information transfer path between printer controller 116 and host 102.

Replaceable printer component 108 includes a component of printing system 104 that is insertable in and removable from printing system 104. In one embodiment, replaceable printer component 108 includes a consumable component that is disposed of and replaced at an end of a useful life thereof. An example of such a consumable component includes an ink container or a toner cartridge that contains a supply of marking material for printing system 104. The marking material is deposited on print medium 118 by printing system 104 and depleted during a useful life of the ink container or toner cartridge. As such, the ink container or toner cartridge is disposed of and replaced at an end of a useful life thereof or is remanufactured and reused.

In another embodiment, replaceable printer component 108 includes a printing component that is readily replaced in printing system 104. Examples of such a printing component include a printhead that selectively deposits ink on print medium 118 in response to control signals from printer controller 116 or a printer cartridge that includes a printhead and an ink supply. Thus, replaceable printer component 108 may include an ink container, a printhead, or a printer cartridge if, for example, printing system 104 includes an inkjet printer. In addition, replaceable printer component 108 may include a toner cartridge or a developer drum if, for example, printing system 104 includes a laser printer. Further, replaceable printer component 108 may include a peripheral device of printing system 104, such as an Ethernet card, a duplexer, a paper finisher (e.g., stapler, hole punch, etc.), or another suitable device.

Printer controller 116 and replaceable printer component 108 communicate with each other via a communication link 114. Communication link 114 facilitates information transfer between printer controller 116 and replaceable printer component 108 when replaceable printer component 108 is installed in printing system 104. Communication link 114 includes, for example, an electrical, optical, infrared, or other suitable information transfer path between replaceable printer component 108 and printer controller 116.

Replaceable printer component 108 includes a memory device 110 that stores information for replaceable printer component 108 and/or printing system 104. In one embodiment, memory device 110 includes a 256-byte or another suitably sized non-volatile memory, such as an EEPROM, FLASH, or another suitable memory. In one embodiment, memory device 110 stores, for example, information that is specific to replaceable printer component 108 and/or information that is applicable to printing system 104. In addition, memory device 110 can have information to be used by printing system 104 stored therein or can record information for printing system 104. In one embodiment, information that may be stored in memory device 110 includes operational and/or non-operational parameters for replaceable printer component 108 and/or printing system 104.

In one embodiment, replaceable printer component 108 includes a communication link 112 that electrically couples or communicatively couples memory device 110 with communication link 114 and, therefore, with printer controller 116 when replaceable printer component 108 is installed in printing system 104. As such, when replaceable printer component 108 is installed in printing system 104, memory device 110 communicates with printer controller 116 via communication links 112 and 114. Thus, communication links 112 and 114 include, for example, electrical couplings or connections such as electrical contacts or pins that mate with corresponding electrical nodes or receptacles, respectively.

Printer controller 116 includes an encryption/decryption circuit, logic, or algorithm 117. With replaceable printer component 108 installed in printing system 104, printer controller 116 reads the information stored in memory device 110 including tag encryption mask 111, the tags, and the data defined by the tags. Encryption/decryption algorithm 117 then decrypts the data defined by each tag where tag encryption mask 111 indicates that the data defined by a tag is encrypted. Therefore, some blocks of the data stored in memory device 110 may be encrypted while other blocks of the data stored in memory device 110 may be left unencrypted. When printer controller 116 writes data to memory device 110, encryption/decryption algorithm 117 first encrypts the data defined by each tag where tag encryption mask 111 indicates that the data defined by a tag is encrypted. The encrypted data is then written to memory device 110.

Tag encryption mask 111 enables any selected portions or blocks of memory device 110 to be encrypted by the manufacturer or other authorized user of replaceable printer component 108 without printing system 104 being previously programmed to recognize certain portions or blocks of memory device 110 as storing encrypted data. Thus, the data encrypted and the location of the encrypted data stored in memory device 110 of replaceable printer component 108 may vary over the lifetime of printing system 104.

FIG. 2 is a table illustrating one embodiment of a format 150 of information stored within memory device 110 of a replaceable printer component 108. Memory device 110 includes a header area as indicated at 152 and a data area as indicated at 154. Header area 152 begins at address 0 and ends at address "A−1", where "A" is an integer number of bytes of memory device 110. In one embodiment, header area 152 is not encrypted. Header area 152 includes tag encryption mask 111. In one embodiment, tag encryption mask 111 includes 2-bytes (16-bits) of memory device 110.

In one embodiment, data area 154 includes 16 portions or blocks of memory device 110. In other embodiments, data area 154 includes fewer than 16 portions or blocks. Each of the 16 blocks includes a tag as indicated by "T0" to "T15" and tag data. For each block, the tag is stored in memory device 110 directly preceding the tag data. In one embodiment, the tags are not encrypted. Each tag defines a tag identity and the length of the tag data. The tag identity identifies the type of data stored in the following block of memory device 110. From the length of the tag data, the address range for the block is determined. The address range for each block is defined by "A" to "0", where each letter "A" to "0" is an integer number of bytes of memory device 110. For example, tag "T0" defines the type of data stored in address range "A+1" to "B−1". Tag "T1" defines the type of data stored in address range "B+1" to "C−1". Likewise, tag "T15" defines the type of data stored in address range "P+1" to "Q−1". The tags can be stored in any order within data area 154. In addition, the included tag identities do not need to form a contiguous range. For example, in one embodiment, data area 154 includes six blocks storing data defined by the following tags in the given order: "T3", T1", T4", "T5", "T6", and "T10". The type of data and the length of the data defined by each tag can vary between each tag "T0" to "T15". For example, the length of tag "T0" data may equal 12-bytes, the length of tag "T1" data may equal 32-bytes, the length of tag "T2" data may equal 44-bytes, etc.

Each respective bit of tag encryption mask 111 indicates whether the tag data defined by each respective tag is encrypted or unencrypted. The first bit of tag encryption mask 111 indicates whether the data defined by tag "T0" is encrypted or unencrypted. The second bit of tag encryption mask 111 indicates whether the data defined by tag "T1" is encrypted or unencrypted. Likewise, the 16th bit of tag encryption mask 111 indicates whether the data defined by tag "T15" is encrypted or unencrypted.

In one embodiment, a logic "0" bit within tag encryption mask 111 indicates the data defined by the corresponding tag is unencrypted and a logic "1" bit within tag encryption mask 111 indicates the data defined by the corresponding tag is encrypted. In another embodiment, a logic "1" bit within tag encryption mask 111 indicates the data defined by the corresponding tag is unencrypted and a logic "0" bit within tag encryption mask 111 indicates the data defined by the corresponding tag is encrypted. For example, in one embodiment where a logic "1" indicates encrypted data, a tag encryption mask equal to "0010-0000-0100-0001" indicates that the data defined by tags "T13", "T6", and "T0" is encrypted, and the data defined by the remaining tags is unencrypted. In other embodiments, a different number of tags and a corresponding different length tag encryption mask 111 are used, such as 32 tags and a corresponding 32-bit tag encryption mask.

Figure 3:
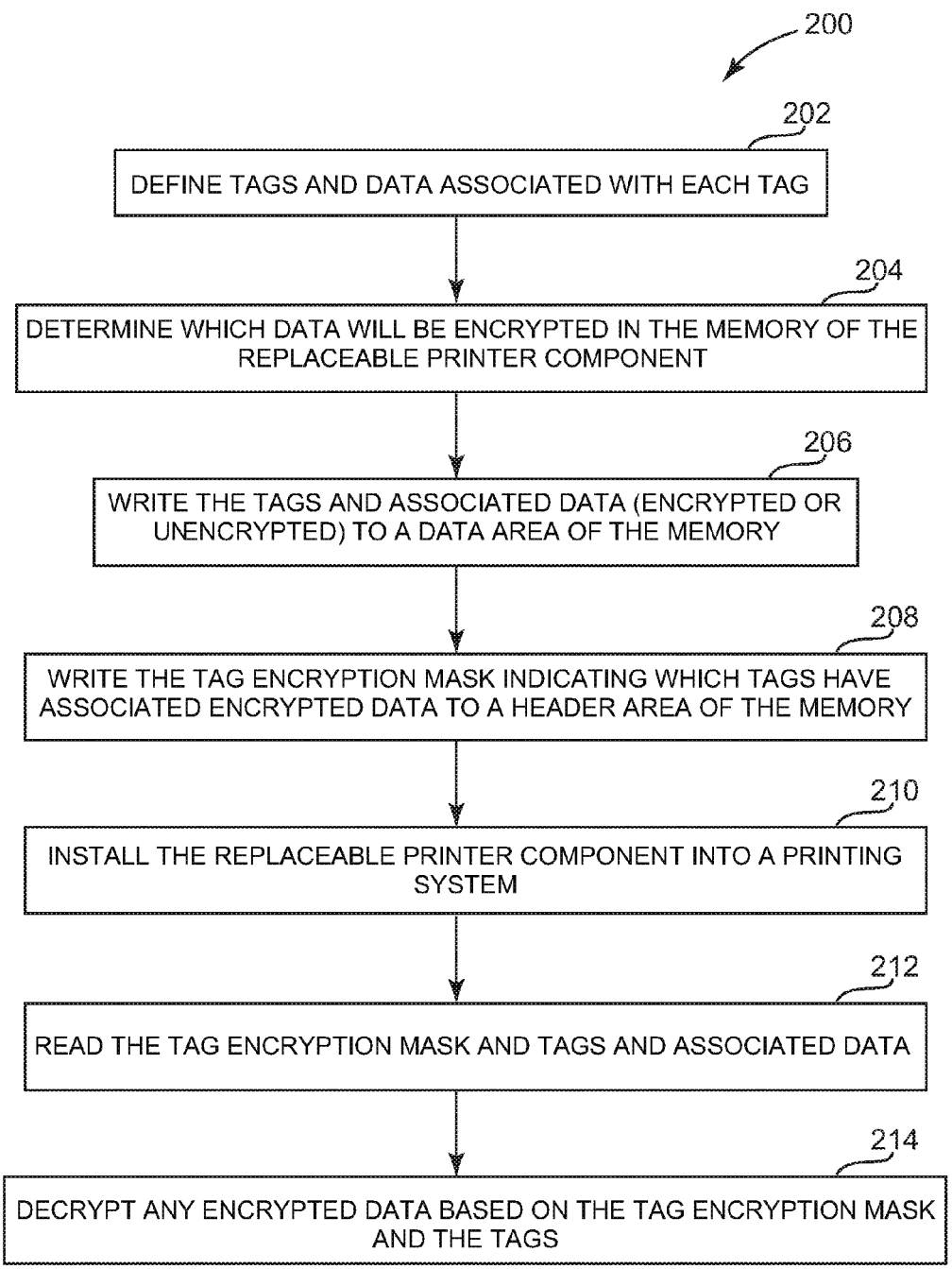
FIG. 3 is a flow diagram illustrating one embodiment of a method for using a memory device of a replaceable printer component.

FIG. 3 is a flow diagram illustrating one embodiment of a method 200 for using memory device 110 of replaceable printer component 108. At 202, the tags and the data associated with each tag are defined. Each tag defines the type of data to be stored following the tag and the length of the data. At 204, the data to be encrypted in memory device 110 of replaceable printer component 108 is identified. At 206, the identified data is encrypted and the tags and the data defined by the tags are written to the data area of memory device 110. At 208, the tag encryption mask indicating which data is encrypted and which data is unencrypted is written to the header area of memory device 110. In one embodiment, the previous process described by blocks 202 through 208 is performed by the manufacturer of replaceable printer component 108 during the manufacturing process of replaceable printer component 108.

At 210, a user installs replaceable printer component 108 into a printing system 104. With replaceable printer component 108 installed in a printing system 104, printer controller 116 establishes communications with memory device 108 through communication links 112 and 114. At 212, printer controller 116 reads memory device 110 including the tag encryption mask and the tags and data defined by the tags. At 214, encryption/decryption algorithm 117 of printer controller 116 decrypts any encrypted data read from memory device 110 as indicated by the tag encryption mask. When printer controller 116 writes data to memory device 110, encryption/decryption algorithm 117 first encrypts any data to be written to an encrypted portion of memory device 110 as indicated by the tag encryption mask.

Embodiments provide a replaceable printer component including a memory device. Memory device embodiments store a tag encryption mask indicating which portions of the memory device are storing encrypted data and which portions of the memory device are storing unencrypted data. A printing system in which a replaceable printer component embodiment is installed decrypts the encrypted data based on the tag encryption mask during read operations. In addition, the printing system in which the replaceable printer component embodiment is installed encrypts data based on the tag encryption mask during write operations. Therefore, in embodiments, the data encrypted and the location of the encrypted data stored in the memory device of the replaceable printer component may vary over the lifetime of the printing system.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A memory device to store data related coupled to a replaceable printer component comprising:
a non-volatile memory unit;
an interface to provide communication between the non-volatile memory unit and a printer controller;
a plurality of data blocks in a data area of the non-volatile memory unit;
a plurality of corresponding tags in the non-volatile memory unit, a tag being associated with each data block, the tags and the data being written to the at least one block based on the determination as to whether the at least one block of the data is to be encrypted; and
a tag encryption mask stored within a header area of the non-volatile memory unit;
wherein the non-volatile memory unit is to store encrypted data and unencrypted data, and
wherein the tag encryption mask indicates an encryption status of each block of the non-volatile memory unit defined by the tags.

2. The memory device of claim 1, wherein each tag defines a length of the data stored in a corresponding data block of the plurality of data blocks and wherein a type and length of the data stored in at least two of the plurality of data blocks varies.

3. The memory device of claim 2, wherein each tag identifies a type of data stored in a corresponding one of the data blocks.

4. The memory device of claim 2, wherein each tag specifies a length of a corresponding one of the data blocks.

5. The memory device of claim 2, wherein each respective bit of the tag encryption mask corresponds to a specific tag and data block in the memory unit and indicates whether that corresponding specific data block contains data that is encrypted or unencrypted.

6. The memory device of claim 1, wherein data stored in the memory device comprises information regarding an associated replaceable printer component.

7. The memory device of claim 6, wherein the data comprises data recorded by a printing system and stored on the memory device.

8. The memory device of claim 6, wherein the data comprises operational parameters for the replaceable printer component.

9. The memory device of claim 1, wherein each tag defines a tag identity and a length of a corresponding data block, wherein the tag identity identifies a type of data stored in the corresponding data block.

10. The memory device of claim 1, wherein the tag encryption mask controls whether data being written to a particular data block by the printer controller is encrypted or unencrypted.

11. The memory device of claim 1, wherein each tag is located in the memory unit directly preceding one of the data blocks to which that tag corresponds.

12. A method of storing data on a memory device coupled to a replaceable printer component comprising:
defining at least one tag, the tags defining at least one block of the memory device;
defining data associated with each tag;
determining whether the data is to be encrypted when stored in the memory device of the replaceable printer component;
writing the tags and the data to the at least one block based on the determination as to whether the at least one block of the data is to be encrypted; and
write a tag encryption mask to a header of the memory device,
wherein the tag encryption mask indicates an encryption status of each block of the memory device defined by the tag.

13. The method of claim 12, wherein a type and a length of the data stored in at least two different data blocks associated with two different corresponding tags varies.

14. The method of claim 12, wherein the memory device comprises n number of tags to define n number of blocks of the memory device, and wherein the tag encryption mask comprises n number of bits, each of the bits indicating the encryption status of one of the n number of blocks of the memory device.

15. The method of claim 12, wherein the data defines information regarding the replaceable printer component.

16. The method of claim 12, wherein the data comprises data recorded by a printing system and stored on the memory device.

17. The method of claim 12, wherein the data comprises operational parameters for the replaceable printer component, operational parameters for a printing system to which the replaceable printer component is communicatively coupled, non-operational parameters for the replaceable printer component, non-operational parameters for the printing system, or combinations thereof.

18. A memory device to store data related to a replaceable printer component comprising:
   a non-volatile memory unit;
   an interface to provide communication between the non-volatile memory unit and a printer controller;
   a plurality of data blocks in a data area of the non-volatile memory unit;
   a plurality of corresponding tags in the non-volatile memory unit, each tag being located in the memory unit directly preceding one of the data blocks to which that tag corresponds such that a tag is associated with each data block, the tags and the data being written to the at least one block based on the determination as to whether the at least one block of the data is to be encrypted; and
   a tag encryption mask stored within a header area of the non-volatile memory unit;
   wherein the memory device is to store encrypted data and unencrypted data,
   wherein the tag encryption mask indicates, for each tag, an encryption status of each block of the non-volatile memory unit defined by the tags, and
   wherein a type or length of data stored in at least two different memory blocks varies.

19. The memory device of claim 18, wherein each respective bit of the tag encryption mask corresponds to a specific tag and data block in the memory unit and indicates, whether that corresponding specific data block contains data that is encrypted or unencrypted.

\* \* \* \* \*